United States Patent Office 3,594,396
Patented July 20, 1971

3,594,396
CRYSTALLINE ORGANOLITHIUM COMPLEXES CONTAINING SILICON
Arthur W. Langer, Jr., 175 Oakwood Road,
Watchung, N.J. 07060
No Drawing. Division of application Ser. No. 690,054, Dec. 13, 1967, which is a continuation-in-part of application Ser. No. 560,110, June 24, 1966, which is a continuation-in-part of application Ser. No. 505,976, Nov. 1, 1965, which in turn is a continuation-in-part of applications Ser. No. 359,434, Apr. 13, 1964, and Ser. No. 589,240, Oct. 25, 1966. Said applications Ser. No. 359,434 and Ser. No. 589,240 being continuations-in-part of application Ser. No. 266,188, Mar. 19, 1963. This application Dec. 17, 1969, Ser. No. 886,009
Int. Cl. C07f 7/10; B01j 11/06
U.S. Cl. 260—448.2N
5 Claims

ABSTRACT OF THE DISCLOSURE

New crystalline organolithium compounds which consist of an organolithium in which the organic radical consists of hydrocarbon groups bonded to silicon complexed with a chelating tertiary polyamine in which the monomeric units have a straight chain structural formula are prepared in liquid phase reactions; the products are useful as polymerization and isomerization catalysts and as reagents in organometallic synthesis.

CROSS REFERENCES

This application is a divisional of copending application Ser. No. 690,054, filed Dec. 13, 1967 as a continuation-in-part of copending application Ser. No. 560,110, filed June 24, 1966 and now abandoned, which is a continuation-in-part of Ser. No. 505,976, filed Nov. 1, 1965 and now abandoned, which in turn is a continuation-in-part of Ser. No. 359,434, filed Apr. 13, 1964 and Ser. No. 589,240, filed Oct. 25, 1966, the last two applications being continuations-in-part of Ser. No. 266,188, filed Mar. 19, 1963, now abandoned.

FIELD OF INVENTION

This invention relates to novel crystalline organolithium compounds and their preparation. More particularly, this invention relates to the preparation of novel crystalline organolithium complexes of organolithium complexes of organolithium compounds complexed with chelating tertiary polyamines, preferably chelating tertiary diamines or chelating tertiary triamines.

PRIOR ART

Organolithium compounds are known to be useful intermediates in chemical syntheses, acting in a manner somewhat similar to that of Grignard reagents. Additionally, these compounds are useful as polymerization catalysts, particularly for the polymerization of olefins, e.g., ethylene, butadiene. However, because of the hazardous nature of organolithium compounds and the sensitivity these compounds exhibit towards air and/or moisture, these compounds normally require handling in the form of dilute solutions or as slurries in hydrocarbon solvents or diluents, respectively. Such solvents are expensive, however, because of the high purity required in order to maintain the compounds free of contamination. Further, the cost of packaging and transportation of these compounds is materially increased due to the increased bulk which must be employed. Additionally, the solvents and/or diluents increase the hazards of fire or explosion which can occur if the spontaneously flammable organolithium compounds are accidentally exposed to air. Nevertheless, due to the crystalline nature, the novel compounds to be disclosed herein can be obtained in high purity and are more readily stored, packaged and transported, without the necessity for employing the high purity, often costly diluents and/or solvents. Also, these new compounds are more active as catalysts or organometal reagents than the simple organolithium compounds alone.

SUMMARY OF THE INVENTION

In accordance with this invention, therefore, novel crystalline organolithium compounds which may be represented by the generic formula:

$$(ALi)_n \cdot Ch$$

wherein (ALi) represents an organolithium compound, $n$ is at least 0.5 and may range up to about 10, preferably $n$ is an integer from 1 to 7, and Ch is a chelating tertiary polyamine. The novel crystalline compounds are prepared by (1) reacting, in an inert liquid diluent or solvent, an organolithium compound with a chelating tertiary polyamine, or (2) reacting an organolithium compound with a chelating tertiary amine and a hydrocarbon group-containing compound having a pKa of about 40 or less (the hydrocarbon group-containing compound thereby obviously having a replaceable hydrogen atom), i.e., metallation.

Crystalline products being well defined compositions are thus prepared by complex formation between the chelating tertiary polyamine and the organolithium compound. Only certain specific compositions are believed to form and these will vary depending on the nature of the A group in (ALi) and the structure of the chelating agent. This result is quite surprising in view of the strong complexing capability of the chelating tertiary polyamines which would be expected to form stable complexes with the organolithium at all molar ratios. It is believed, however, that a special stability exists for specific (ALi) aggregate structures.

The organolithium compounds utilized in this invention may be represented by (ALi) wherein A is a monovalent hydrocarbon group-containing radical which may be derived from compounds having formulae selected from the following general formulae:

$$(HR')_a Z(R'')_c, \; (R'')_c Z(CH_3)_d, \; \text{or} \; R'''H$$

wherein R' is a $C_6$–$C_{30}$ hydrocarbon radical containing aromatic or olefinic group and the hydrogen attached to R' is an aromatic, benzylic or allylic hydrogen atom; Z is oxygen, nitrogen, phosphorus, silicon, or sulfur; R'' is hydrogen or a $C_2$–$C_{30}$ hydrocarbon radical such as alkyl, aryl, aralkyl, cycloalkyl, etc.; R''' is a $C_1$–$C_{16}$ hydrocarbyl radical, preferably a $C_1$–$C_8$ hydrocarbon radical, e.g., aryl or aliphatic radicals, or derivatives thereof, such as alkyl, cycloalkyl, cycloalkenyl-alkyl, aryl-alkyl, cycloalkyl-alkyl, aryl-cycloalkyl, cycloalkyl-alkenyl, alkynyl, alkyl-aryl, cycloalkyl-aryl, and the like; $a$ and $c$ are integers whose sum is equal to the value of the valence of Z; $d$ is an integer of at least 1, and the sum of $c$ and $d$ is equal to the value of the valence of Z.

Representative examples of compounds containing such radicals (the radicals being formed, of course, by the elimination of a hydrogen atom) are: (a) alcohols such as phenol, benzyl alcohol, methanol, isopropanol, t-butanol, etc.; (b) ethers such as methyl phenyl ether (anisole), diphenyl ether, p-tolyl butyl ether, benzyl ethyl ether, allyl ethyl ether, propenyl propyl ether, dibenzofuran, cyclohexyl methyl ether, etc.; (c) primary, secondary and tertiary amines such as 4-ethyl-N,N,N',N'-tetramethyl-o-phenylenediamine, 2,5-dimethylpyridine, N,N-diethyl aniline, trimethyl amine, methyl dibutyl amine, N-methyl piperidine, diphenyl amine, diethylamine, piperidine, etc.; (d) primary, secondary and tertiary phosphines such as butyl phosphine, diphenyl phosphine, dimethyl phosphine, trimethyl phosphine, diethyl phenyl phosphine, diphenyl methyl phosphine, etc.; (e) silanes such as trimethyl silane, tetramethyl silane, triphenylmethyl silane, etc.; (f) mercaptans and sulfides such as methyl mercaptan, phenyl mercaptain, benzyl mecraptan, methyl sulfide, allyl propyl sulfide, phenylethyl sulfide, cyclohexyl methyl sulfide, etc.; (g) unsaturated hydrocarbons such as propylene,pentene-1, pentene-2, butene-2, octene-1, octene-2, butenyl benzene, 1,5-hexadiene, acetylene hexyne-1, etc.; (h) polymers such as polybutadiene, polystyrene, polyisoprene, styrene-isobutylene copolymers, butyl rubber, etc.; and (i) hydrocarbons such as benzene, naphthalene, diphenyl, fluorene, toluene, xylene, triphenyl methane, thiophene, dibenzene chromium, ferrocene, cyclopropane and $C_1$–$C_{20}$ alkylated or cycloalkylated cyclopropanes containing at least 4 hydrogen atoms on the ring, e.g., octylcyclopropane, 1,1-dimethyl cyclopropane, 1-ethyl-2-propylcyclopropane, paraffins, both normal and iso, e.g., methane, ethane, propane and their homologous series, and the like; (j) carboxylic acids such as acetic, propionic, valeric, butyric, etc., stearic, lauric, azelaic, and the like. Preferably, however, the organic portion is a hydrocarbyl, either saturated or unsaturated.

It is essential in either reaction to employ a chelating tertiary polyamine since nonchelating polyamines are believed to form open chain polymeric structures when reacted with the organolithium compounds. Thus, in terms of utility, these open chain polymeric structures would be generally less soluble and, therefore, less reactive for equivalent reactant ratios. Thus, the chelating agent employed herein may be broadly described as a chelating tertiary polyamine, either monomeric or polymeric, and the monomeric group preferably contains about 3 to about 50 carbon atoms. However, chelating tertiary diamines and chelating tertiary triamines are preferred, the chelating tertiary diamines being particularly preferred. Suitably, the monomeic units have a structure within the scope of the following structural formulae, which may be open chain or cyclic:

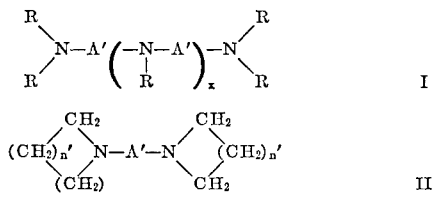

wherein the R groups in the above formulae may be the same or different and are $C_1$–$C_4$ alkyl radicals, preferably at least one R being a methyl radical; A' is a nonreactive group; n' is an integer from 0 to 3 inclusive, and x is an integer from 0–2 inclusive.

For the purposes of this invention, A' in the above formulae, is selected from the group consisting of:

(1) aromatic radicals and cycloaliphatic radicals having ring structures containing 4–7 members, including the lower alkyl (e.g. $C_1$–$C_4$) derivatives of said radicals wherein said radicals are attached to the nitrogen atoms at 1,2 or 1,3 positions on the rings; suitable examples including N,N,N',N'-tetramethyl-cis - 1,2 - cyclopentanediamine, N,N,N',N'-tetramethyl - 1,2 - cyclohexanediamine, N,N,N',N'-tetramethyl - o - phenylenediamine, 4 - ethyl-N,N,N',N' - tetramethyl - o - phenylenediamine, hexamethyl - 1,3,5 - cyclohexanetriamine, N,N',N'' - trimethyl-1,3,5 - triazine, and the like; (2) a monoethylenic radical, said radical containing 0 to 2 monovalent hydrocarbon radicals of 1 to 8 carbon atoms; suitable examples include N,N,N',N' - tetramethyl - 1,2 - diaminoethylene, N,N,N', N' - tetramethyl - 3,4 - diaminohexene - 3, and the like; and (3) 1 to 4 methylenic radicals inclusive, wherein each methylenic radical contains 0 to 2 monovalent hydrocarbon radicals of 1 to 6 carbon atoms; suitable examples include 1,2-dipiperidyl ethane, N, N'-dimethyl-N,N'-diethyl - 1,2 - ethanediamine, N,N,N',N' - tetramethyl - 1-cyclohexyl - 1,2 - ethanediamine, N,N,N',N' - tetramethyl-1,2 - pentanediamine, N,N,N',N' - tetramethyl - 1, 2 - propanediamine, N,N,N',N' - tetramethyl - 2,3 - butanediamine, N,N,N',N' - tetramethyl - 1,4 - butanediamine, and the like. Examples of higher chelating polyamines include N,N,N',N'',N'' - pentamethyldiethylenetriamine, N,N,N', N'',N''',N''' - hexamethyltriethylenetetramine, poly(N-ethyl-ethyleneimine), and the like.

Although the polyamines set forth herein are particularly preferred insofar as their availability and cost as well as stability of the complex prepared from such amines, care should nevertheless be taken (when the crystalline complex is to be formed by metallation) in choosing a polyamine wherein A in the general formulae has an acidity less than that of the hydrocarbon group-containing compound to be employed in the reaction. In other words, the polyamine should be one which itself would not become metallated in preference to the metallation of the hydrocarbon group-containing compound.

Particularly preferred as the chelating tertiary amine is the formula shown by I above where A' is defined by either of (1) or (3) above. Suitable examples of these preferred chelating tertiary amines include: N,N,N',N'-tetramethyl-methanediamine, N,N-dimethyl - N',N' - diethyl - 1,2 - ethanediamine, N,N,N',N' - tetramethyl - 1,2-ethanediamine, N,N,N',N' - tetraethyl-1,2-ethanediamine, N,N,N',N' - tetramethyl - 1,3 - propanediamine, N,N,N', N' - tetramethyl 1,2 - propanediamine, N,N,N',N'-tetramethyl - 1,4 - butanediamine, N,N,N',N' - tetramethyl-1, 2 - cyclohexanediamine, and the like. Most particularly preferred herein are N,N,N',N' - tetramethyl - 1,2 - ethanediamine, hereinafter referred to as TMEDA, and N,N, N',N' - tetramethyl - 1,2 - cyclohexane diamine, hereinafter referred to as TMCHDA.

The novel crystalline compounds of the instant invention are prepared in the first method by reacting the organolithium reagent with the chelating tertiary polyamine in the liquid phase. However, because the reaction is exothermic and, therefore, would require extensive cooling and/or elaborate mixing techniques to prevent decomposition of the product and/or reactants, it is normally preferred to conduct the reaction in the presence of an inert solvent or diluent. Generally, the reagents are soluble in most hydrocarbons. Solvents or diluents that can be employed are saturated aliphatic or saturated cycloaliphatic hydrocarbons having 2 to about 20 carbon atoms and are liquefied at reaction temperatures and inert with respect to the reactants, e.g., pentane, isopentane, hexane, heptane, isooctane, cyclohexane, hexadecane, and the like. With some less reactive organolithium compounds, e.g., aryl lithium or alkoxy lithium compounds, aromatic hydrocarbons having about 6 to 20 carbons may also be successfully employed as inert diluents/solvents, e.g., benzene, toluene, xylenes, alkylnaphthalenes, tetrahydronaphthalene and the like. Generally, however, light paraffins or isoparaffins are to be preferred here due to their inert character and the ease with which the product may be recovered from these solvents.

These novel crystalline complexes can also be prepared by metallation. In this process, the crystalline complex is formed by admixing (reacting) an organolithium with the polyamine and a hydrocarbon group-containing compound having a pKa of about 40 or less (the hydrocarbon group-containing compound thereby obviously having a replaceable hydrogen atom).

The general reaction for this process is as follows:

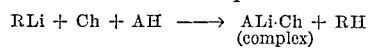

The above general reaction may be ilustrated with n-butyllithium ($C_4H_9Li$), N,N,N',N' - tetramethylethanediamine ("TMEDA") and benzene:

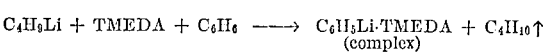

As can be seen from these equations, the reaction will proceed satisfactorily so long as the hydrocarbon group-containing compound is sufficiently acidic, i.e., having an acidity corresponding to a pKa of about 40 or less. In the general reaction, AH has greater kinetic or thermodynamic acidity than RH. In the specific reaction, the reaction proceeds satisfactorily because $C_6H_6$ is a stronger protonic acid than $C_4H_{10}$.

The general reaction is known as "metallation" and is analogous to known metallation reactions except for the following aspects: (1) the chelating tertiary polyamine assists in the reaction and combines with the product to produce novel materials; (2) in the absence of the polyamine, organolithiums generally will not react with aromatic, cyclopropyl or other weakly acidic hydrocarbon compounds to produce the desired lithium compounds; (3) the reactions can be carried out in hydrocarbon media rather than polar media so that the new crystalline complexes are obtained in a more useful and less expensive solvent, as well as a more stable solvent, for use in polymerizations, syntheses, etc.; (4) the polyamine is capable of forming a stable chelate complex with lithium which markedly increases the reactivity of the organolithium compounds.

In this second method of preparation, the organolithium suitably contains from 1 to 15 carbon atoms. Alkyl, cycloalkyl, aryl or aralkyl lithium compounds are all suitable so long as the organo portion of the organolithium forms a weaker acid than the organic compound with which it reacts. Examples include methyllithium, butyllithium, cyclooctyllithium, dodecyllithium, 2-methyl butyllithium, phenyllithium, benzyllithium, sec-butyllithium, allyllithium, and vinyllithium. Secondary and tertiary alkyllithiums are the most reactive compounds. Alkyllithium compounds are preferred, and of these, $C_1$–$C_8$ alkyllithiums are more preferred.

The hydrocarbon group-containing compound employed in this process is one which has a pKa of about 40 or less on the MSAD pKa scale. Some organic compounds having such a pKa are shown on page 19, Table XIV, of D. J. Cram, Fundamentals of Carbanion Chemistry, Academic Press, New York, 1965. Particularly preferred, however, are organic compounds having a pKa of about 15 to about 40. In general, the useful hydrocarbon group-containing compounds are those monomers or polymers whose general formulae have been previously described as "AH."

The hydrocarbon group-containing compound of choice may be any one of those having the requisite pKa set forth above. However, it is preferred that the organic compound not contain any conjugated double bonds, allenic bonds or acetylenic bonds since these compounds may undergo side reactions rather than or in addition to the metallation reaction. These compounds are all metallated at their most acidic position to yield the corresponding hydrocarbon lithium · chelating polyamine crystalline complex. Thus, for example, hydrocarbons having aromatic benzylic or allylic hydrogen would produce complexes in which the lithium atom is attached to the aromatic nucleus, benzylic position or allylic position.

If desired, the metallation reaction may be effected in a hydrocarbon diluent which is not reactive with the components, e.g., a $C_5$–$C_{10}$ alkane or cycloalkane such as hexane, heptane, cyclohexane, etc. Alternatively, extraneous diluents need not be used and an excess of the hydrocarbon group-containing compound itself may be employed as the diluent.

It should be noted that the two reaction systems reported here for preparing the novel crystalline complexes of this invention may overlap to some degree. However, one skilled in the art will readily determine the reaction to be effected by simply knowing the relative basicity or acidity of his reaction components. Thus, metallation will not occur when the extraneous component, i.e., solvent or diluent, is not sufficiently acidic, that is, a weaker protonic acid than the organic portion of the organolithium compound.

In preparing the novel crystalline compounds in accordance with either method of preparation, all steps should be carried out in the substantial absence of oxygen, moisture, carbon dioxide or other harmful impurities. This can be readily accomplished by blanketing all the raw materials, i.e., the reagents, inert diluents, etc., with an inert gas such as dry nitrogen or argon. Electron donors such as amines, mercaptans, ketones, aldehydes, etc., are generally poisonous to the catalysts and preferably the solvent or diluent should contain less than about 50 p.p.m. by weight of these impurities. Preferably all materials are purified, e.g., by drying, distillation, etc., prior to their use.

Reaction conditions for either method are generally not critical and temperatures will normally be below about 200° C., preferably below about 100° C., more preferably below about 50° C., and still more preferably below about 30° C., in order to prevent decomposition reactions. Still more preferably, however, temperatures will be in the range of about −100° C. to +30° C. Pressures are not critical since the reaction will normally take place in the liquid phase and atmospheric pressure can be advantageously utilized. Reaction periods are generally short for either method and the complete reaction usually occurs within about one minute to about 4 hours, although up to several days may be required in some cases where the driving force is relatively small, e.g., in some metallation reactions.

The molar ratio of lithium to chelating tertiary amine is highly important in order that the desired complex be formed. Thus, molar ratios of (ALi) to chelating tetriary amine may range from about 1:10 to 10:1. When the metallation reaction is employed, the same ratios will hold for RLi:chelating tertiary amine, except that the hydrocarbon group-containing compound must be present in an amount sufficient to replace all of the R in RLi and should preferably be in excess, e.g., 50% excess or higher in order to drive the reaction to completion. However, it is more preferable to utilize the stoichiometric proportion required to obtain the desired composition. In this regard, it has been found that true compound formation occurs only with certain specific ratios, that is, if an incorrect ratio (for true compound formation) were employed, the product would have predominantly the composition of the nearest compound, and could consist of a mixture of several compounds. To illustrate, the crystalline product $(C_4H_9Li)_4$·TMEDA can readily be formed by reacting 4 moles of $C_4H_9Li$ with one mole of TMEDA; however, if a 3/1 reaction mixture were employed, a crystalline product consisting primarily of $(C_4H_9Li)_2$·TMEDA would be obtained, the 3/1 crystalline compound never having been observed with these components. Obviously, the best yields and purity will result when proper stoichiometric amounts are employed.

Prior to the present invention, crystalline complexes of organolithium compounds and chelating tertiary polyamines were unknown. It was particularly surprising to be able to isolate crystalline, stoichiometric complexes from mixtures containing the noncrystallizable, liquid alkyllithiums, such as butyllithium. Such complexes offer advantages in the preparation and use of high purity reagents or catalysts by virtue of their crystallizability and ease of isolation. In addition, they have greater chemical reactivity than the simple organolithium compounds alone. While not wishing to be restricted to theory, it is believed that the specific compositions obtained in these systems represent a balance of the stabilities of the bridging carbon bonds in the organolithium aggregates and the strength of the chelate solvation, the latter being related to both Lewis basicity and steric factors.

Although some crystalline 1:1 complexes of alkyllithium with chelates can be prepared and isolated at low temperatures, they have extraordinary reactivity and yield metallatedchelate or decomposition products very rapidly. Therefore, there is generally less incentive to prepare these crystalline 1:1 complexes since their use is normally limited by the necessity of treating such complexes as dilute solution. However, other low ratio crystalline complexes, e.g., 1:1, are readily prepared with less reactive groups, that is, less basic, i.e., a lower carbanion reactivity, than the alkyl, e.g., aryl. It is also recognized that there are new stoichiometric compositions which are not crystalline or which crystallize with great difficulty. These are of less value because one does not gain the advantages of purifying and handling crystalline solids.

The crystalline complexes can easily be precipitated from the reaction mixture. Thus, while the reagents are both readily soluble in the aforementioned hydrocarbon solvents, the crystalline product is rather less soluble and will tend to crystallize from solution with lowering temperatures or increasing concentration. However, mere mixing of the reagents will not generally result in the formation of a crystalline complex and some recovery procedure must be employed. Thus, recovery of the various new compounds may be accomplished by cooling the reaction mixture to temperatures below 50° C., more preferably in the range of about −100° C. to +30° C. or, by vacuum drying to remove solvent, thereby increasing concentration. In order to promote solution of the reagents or to promote the reaction itself, the reaction mixture may be heated, within the specified ranges, without deleterious effect. Now, with regard to the particular complex to be formed, especially when nonstoichiometric quantities are employed the least soluble species of the nearest composition will tend to form predominantly since rapid exchange can take place between all the aggregate compositions present until the most stable and least soluble complex is formed. The crystalline complexes may be separated easily by any conventional process, such as filtration, decantation, centrifugation, etc., and the crystals may be further purified by washing or recrystallization one or more times from suitable hydrocarbon solvents, such as those previously described.

The following examples illustrate the preparation of a variety of compounds which typify the new class of crystalline organolithium compounds claimed in this invention. They are intended to be illustrative but not restrictive, of the scope of the invention, the only restrictions being those in the claims appended hereto.

EXAMPLE 1

Butyllithium (BuLi) and TMEDA were mixed in various proportions in n-heptane such that the BuLi concentration remained constant at 0.5 M. The solutions were charged to NMR tubes and they were frozen after 15 minutes at 25° C., the NMR tubes were sealed, and the tubes stored in Dry Ice until ready for NMR analysis. They were then warmed to −30°, +20°, +30° and +40° C. for analysis. The compositions and observations are tabulated below.

| Molarity | | Crystal- | Temperature at which solids |
|---|---|---|---|
| BuLi | TMEDA | line solids | dissolved, ° C. |
| 0.5 | 0 | | |
| 0.5 | 0.05 | + | 30 |
| 0.5 | 0.15 | + | 40 |
| 0.5 | 0.25 | + | 40 |
| 0.5 | 0.35 | + | 30 |
| 0.5 | 0.5 | | |
| 0.5 | 0.75 | | |
| 0.5 | 1.0 | | |

NMR showed that different compounds were formed up to a 1:1 ratio. Crystalline solids formed from the components between 10:1 and about 1.4:1 BuLi:TMEDA mole ratio. The crystalline solids were found to have the compositions $(BuLi)_4 \cdot TMEDA$ and $(BuLi)_2 \cdot TMEDA$ by elemental analysis and cryoscopic molecular weight.

EXAMPLE 2

$(BuLi)_4 \cdot TMEDA$ was prepared by mixing 20 mmoles BuLi and 5 mmoles TMEDA in 50 ml. n-heptane for 15 minutes at room temperature. Chilling the solution to −70° C. yielded a heavy precipitate of white crystals which were filtered cold, reslurried in 10 ml. n-heptane, chilled to −70° C., filtered and vacuum dried. Yield=1.51 g., theory=1.86 g.

In a second preparation, the crystals were washed with n-heptane which had been cooled in liquid nitrogen to minimize loss due to solubility. The yield was increased to 1.73 g. (93% of theory).

EXAMPLE 3

$(BuLi)_2 \cdot TMEDA$ was prepared according to Example 2 using 20 mmoles BuLi and 10 mmoles TMEDA in 45 ml. n-heptane. The yield of white crystals was 1.54 g. (theory=2.44 g.).

EXAMPLE 4

In 3 preparations, 12 mmole phenyllithium ($C_6H_5Li$) in 20–25 ml. benzene was mixed with 2, 3 and 6 mmole TMEDA. The mixtures were heated to 70–80° C. for 1 hour and an additional 20 ml. benzene added to each preparation. Heating was continued another 5½ hours, the hot solutions were separated from a small amount of insoluble residue and the products were allowed to crystallize at room temperature. The 12:2 and 12:3 phenyllithium:TMEDA solutions were chilled to complete the precipitation of product. The solids were separated and vacuum dried. Yields and analysis are shown below.

| Mole ratio in feed $C_6H_5Li$:TMEDA | Yields of crystals, g. | Percent N | Product structure | Percent N, theory | Grams yield, theory |
|---|---|---|---|---|---|
| 6:1 | 0.65 | 7.84 | $(C_6H_5Li)_3 \cdot TMEDA$ | 7.61 | 0.74 |
| 4:1 | 1.12 | 7.94 | $(C_6H_5Li)_3 \cdot TMEDA$ | 7.61 | 1.10 |
| 2:1 | 1.62 | 9.15 | $(C_6H_5Li)_2 \cdot TMEDA$ | 9.85 | 1.71 |

Therefore, the product was predominantly $(C_6H_5Li)_3 \cdot TMEDA$ in spite of the use of higher ratios in the feed (6:1 and 4:1). The attempt to prepare a 2:1 compound gave a product having a nitrogen content between that of $(C_6H_5Li)_3 \cdot TMEDA$ and $(C_6H_5Li)_2 \cdot TMEDA$. This indicates that the latter must be formed but it is of lower stability than the 3:1 compound. In some fractions isolated from these experiments, there was also evidence for $(C_6H_5Li)_4 \cdot TMEDA$.

EXAMPLE 5

Following the procedure of Example 4, methyllithium (MeLi) and TMEDA were reacted at 4:1 and 2:1 mole ratios and the crystals isolated in the same manner as described above. In a third preparation, 12 mmoles MeLi, 30 mmoles TMEDA and 20 ml. n-heptane were heated to 90° C., a very small amount of insoluble material was separated, and the clear solution was evaporated and vacuum dried.

| Feed mole ratio MeLi:TMEDA | Yield of crystals, g. | Percent N | Proposed structure | Percent N, theory | Grams yield, theory |
|---|---|---|---|---|---|
| 4:1 | 0.099 | 10.3 | $(MeLi)_7 \cdot TMEDA$ | 10.4 | 0.46 |
| 2:1 | 0.180 | 13.8 | $(MeLi)_4 \cdot TMEDA$ | 13.7 | 0.61 |
| 2:5 | 0.592 | 13.7 | $(MeLi)_4 \cdot TMEDA$ | 13.7 | 0.61 |

These data show that the $(MeLi)_n$ aggregate is much more difficult to break down than either $(BuLi)_n$ or $(C_6H_5Li)_n$ aggregate by comparison with the results in Examples 1–4. The lowest ratio compound obtained was $(MeLi)_4 \cdot TMEDA$ and this resisted further breakdown even in the presence of a large excess of TMEDA at 90° C. The proposed $(MeLi)_7 \cdot TMEDA$ structure obtained in the first preparation was based on a nitrogen analysis of a small sample. It is possible that the compound could be $(MeLi)_7 \cdot TMEDA$, calculated percent N=11.3.

EXAMPLE 6

The preparation of crystalline compounds using other chelating tertiary diamines is illustrated in this example using N,N,N',N' - tetramethyl - 1,3 - propanediamine (TMPDA).

In two experiments, 12 mmole BuLi in 16 ml. n-heptane solution was reacted with 3 and 6 mmoles, respectively, of TMPDA. After 15 minutes at room temperatures, the solutions were cooled to −70° C., the white crystals were filtered, washed with 5 ml. cold heptane, and vacuum dried. The crystals prepared from the 2:1 feed ratio melted upon warming to room temperature.

| Feed mole ratio BuLi:TMEDA | Yield, g. | Percent N | Proposed structure | Percent N, theory | Grams yield, theory |
|---|---|---|---|---|---|
| 4:1 | 0.931 | 6.67 | $(BuLi)_4 \cdot TMPDA$ | 7.25 | 1.16 |
| 2:1 | 0.316 | 11.17 | $(BuLi)_2 \cdot TMPDA$ | 10.83 | 1.55 |

Thus, BuLi forms the same complexes with TMPDA as it does with TMEDA (compare Examples 1–3). However, the 2:1 compound is much lower melting and much more soluble than the corresponding TMEDA compound.

EXAMPLE 7

In three experiments, 2 M BuLi was mixed in various proportions with 1 M, N,N,N',N'-tetramethyl-1,2-cyclohexane-diamine (TMCHDA) in n-heptane and chilled. Crystalline complexes were obtained at 1:1 and 4:1 BuLi:TMCHDA, but only an oil was obtained at 2:1 molar ratio. The crystalline complexes dissolved upon warming to room temperature. The TMCHDA was predominantly the trans isomer.

EXAMPLE 8

BuLi was mixed in various proportions with pure cis-TMCHDA and with pure trans-TMCHDA in approximately 0.2 M concentrations in n-heptane at −50° C. The mixtures were warmed to 0° C. for 15 minutes to complete the reaction and chilled again to −75° C. The relative yields of crystals are shown below:

| BuLi:TMCHDA, mole ratio | 1:1 | 2:1 | 4:1 |
|---|---|---|---|
| Cis-TMCHDA | 0 | 0 | 0 |
| Trans-TMCHDA | ++++ | + | ++ |

These results show that the trans isomer forms crystalline complexes at 1:1 and 4:1 BuLi:TMCHDA ratios. Failure to obtain crystals from any of the mixtures containing cis-TMCHDA could be attributed to greater solubility or poor crystallizability of the complexes.

EXAMPLE 9

The procedure of Example 8 was repeated except that chelating tertiary triamines were used instead of diamines. BuLi was mixed with N,N,N',N'',N''-pentamethyldiethylenetriamine (PMDT) at 1:1, 2:1, 3:1, 4:1, 6:1, 8:1, and 10:1 mole ratios. Heavy crystals were obtained at 2:1, 6:1, 8:1 and 10:1 and a small amount formed at 4:1. The results indicate that discrete complexes formed at 2:1 and about 6:1 BuLi:PMDT.

Mixing BuLi and N,N,N',N',N'',N''-hexamethyl-1,3,5-cyclohexanetriamine (HMCHTA) at 2:1, 3:1 and 4:1 mole ratios under similar conditions resulted in only a trace of crystals from the 2:1 and 3:1 mixtures. A 46% yield of crystals was recovered by filtration from the 4:1 mixture, indicating a discrete complex exists at a 4:1 or slightly higher mole ratio.

EXAMPLE 10

Following the procedures of Examples 2 and 3, a wide variety of new BuLi compounds can be prepared by using other chelating tertiary amines in place of TMEDA. Examples of other effective chelating tertiary amines include: N,N - dimethyl - N',N' - diethyl - 1,2 - ethanediamine, N,N,N',N'-tetramethyl - 2,3 - butane-diamine, N,N,N',N'-tetramethyl-1,2-propane-diamine, 1,2 - dipiperidylethane, and the like.

EXAMPLE 11

The following example is supplied to illustrate one use of these compounds as a polymerization catalyst.

A complex between 2 mmole BuLi and 1 TMEDA was prepared by mixing the components in 50 ml. toluene for 15 minutes at room temperature. The catalyst was added to 470 ml. toluene solution containing 108 g. pure, dry butadiene at 9° C. The temperature was raised to 25–30° C. and maintained for 2.5 hours. A clear yellow viscous solution was obtained. The polybutadiene was isolated by adding 300 ml. n-heptane, extracting catalyst residue by washing with 100 ml. water, and removing solvent in a rotary evaporator at 62 C. and 1 mm. pressure.

The polybutadiene yield was 106 g. showing that the conversion was essentially 100% and that the catalyst was extremely active. Intrinsic viscosity was 1.01, determined in toluene at 30° C. The polymer microstructure was determined by infrared analysis to be 75.9% vinyl, 10.6% trans, and 14.4% cis unsaturation.

In general, these new crystalline organolithium compounds are useful for polymerizing and copolymerizing various monomers, e.g., conjugated diolefins such as butadiene; $C_2$–$C_{10}$ monoolefins, such as ethylene, butenes, etc. and for telomerizing ethylene with aromatics as disclosed in copending application Ser. No. 359,434. Obviously, they would be useful in organometallic syntheses, such as Grignard reactions, by virtue of their known compositions, purity and convenience. The compounds containing hetero atoms attached to the lithium are useful for double bond isomerization and other reactions which require strong base catalysts or reactants.

EXAMPLE 12

Benzyllithium·TMEDT was prepared (metallation) by reacting 2 ml. toluene (18 mmole) with 5 mmoles butyllithium·TMEDA in 5 ml. n-heptane at 25° C. for 15 hours. A solid mass of yellow needles was filtered, washed with heptane and vacuum dried. Yield=0.63 g. (theory=1.07 g.). Losses were due to solubility in heptane as shown by carbonation of the filtrate which yielded 0.20 g. phenylacetic acid, identified by M.P. 73–4° C. (lit. M.P. 76.7° C.) and infrared spectrum. Recovery of 90% of the theoretical yield indicates that reaction was essentially quantitative.

The benzyllithium·TMEDA crystals melted at 70–72° C. (capillary at 1° C./min.). Analysis: 3.28% Li (Calc. 3.24). Complete characterization was done by NMR analysis.

When butyllithium·TMEDA was prepared in toluene solvent, the reaction to form benzyllithium·TMEDA was shown by NMR to be completed in less than 15 min. at 25° C.

EXAMPLE 13

Diphenylmethyllithium·TMEDA was prepared by mixing 0.04 mole each of diphenylmethane, butyllithium, and TMEDA in about 60 ml. n-heptane at 25–30° C. for one hour. A red-orange oil separated, the upper phase was discarded, the oil was washed twice with heptane to remove any unreacted starting material and then vacuum dried. Crystallization occurred during drying. Yield was 11.1 g. (theory=11.6 g.), indicating quantitative reaction. Analysis: 9.31% N (Calc. 9.64); 57.0% diphenylmethyl group by quantitative ultraviolet spectroscopy (calc. 57.5).

EXAMPLE 14

Triphenylmethyllithium·TMEDA was prepared in a manner similar to Example 13, except that a mixture of toluene and heptane was used as solvent. A quantitative yield or red-orange crystals was isolated and analyzed without further purification.

|    | Wt. percent | Calc'd |
|----|-------------|--------|
| C  | 81.65       | 81.93  |
| H  | 8.19        | 8.53   |
| N  | 7.53        | 7.65   |
| Li |             | 1.89   |
| Total |          | 100.00 |

EXAMPLE 15

With the aryllithium compounds, in particular, it was found that more than one mole of chelating polyamine could combine to form complexes which are stable under vacuum at room temperature. These complexes may contain varying amounts of complexing agent up to about two moles per mole of aryllithium. Although the art has only known complexes in which the base complexes to the lithium, these higher complexes appear to have the second mole of base solvating the aryl group rather than the lithium. Consequently, they represent a new class of stable complexes.

Preparation of triphenylmethyllithium complexed to approximately two TMDA molecules can be illustrated two ways:

(a) The 1:1 triphenylmethyllithium·TMEDA complex was prepared and isolated as in Example 4; 1.60 g. (0.0044 mole) was dissolved in 10 ml. toluene and 0.66 ml. (about 0.51 g.) pure TMEDA (0.0044 mole) was added. The new crystalline complex precipitated immediately. After decanting the liquid and washing the solid with heptane, the dark orange-red crystals were vacuum dried to constant weight. Yield was 1.87 g., which is 89% of theory for triphenylmethyllithium·2 TMEDA. Analysis: 11.49% N (calc. 11.6).

(b) An approximate 1:2 complex was prepared directly following the procedure of Example 4, except for the proportions. 0.489 g. triphenylmethane (0.002 mole), 3 ml. benzene, 1 ml. 2 M BuLi in heptane (0.002 mole) and 2 ml. 2 M TMEDA in heptane (0.004 mole) were mixed and allowed to stand 2 days at 25° C. A dark red oil separated and crystalized. The crystals were filtered, washed with 5 ml. heptane and then vacuum dried. Yield of crystals was 0.845 g. Including product recovered from filtrate (0.067 g.), the recovery was 0.912 g. (theory= 0.965 g.). Analysis: 9.54% N (calc. 11.6%).

In a similar manner, complexes containing more than one and less than 2 moles of chelating polyamine per mole of aryllithium are prepared by using the proper proportions in the above procedures since such products are merely mixtures of the 1:1 and 1:2 complexes.

EXAMPLE 16

Naphthyllithium·TMEDA was prepared by (a) dissolving 2 mmoles phenyllithium·TMEDA (0.40 g.) in 5 ml. benzene, (b) adding 2 mmoles (0.256 g.) naphthalene in 5 ml. benzene, and (c) allowing the solution to stand overnight at 25° C. The clear yellow solution was evaporated to dryness under vacuum to obtain the solid naphthyllithium·TMEDA. Yield was 0.52 g. (theory=0.500 g.). Analysis: 11.2% N (calc. 11.2).

EXAMPLE 17

Ferrocenyllithium·TMEDA was prepared by dissolving 0.744 g. ferrocene (0.004 mole) in 20 ml. benzene solution and adding 2 M stock solutions containing 0.004 mole each of butyllithium and TMEDA. A deep orange solution was obtained and was allowed to stand 2 hours at room temperature. The solution was evaporated to dryness under high vacuum, yielding 1.26 g. golden crystals (theory 1.23 g.).

EXAMPLE 18

Ferrocenyl (lithium)$_2$/TMEDA was prepared according to Example 17, except that only 0.372 g. ferrocene (0.002 mole) was used and the metallation was carried out in heptane solvent at 75° C. for one hour. The turbid orange solution was vacuum dried yielding 0.572 g. orange powder (calc. 0.628 g.). Carbonation of 0.522 g., acidification, ether extraction to remove some ferrocene monocarboxylic acid, and vacuum drying the ether insoluble fraction yielded 0.22 g. ferrocene dicarboxylic acid. Analysis: 24.8% O (calc. 23.4).

EXAMPLE 19

Para-t-butylbenzyllithium·TMEDA was prepared by metallating 3 mmoles p-t-butyltoluene with 2 mmoles BuLi·TMEDA in 8 ml. n-heptane at 50–60° C. for 3 hours. Vacuum drying the total mixture gave an orange viscous oil which crystallized upon standing. Yield was 0.47 g. (calc. 0.54 g.). Carbonation yielded p-t-butylphenylacetic acid, identified by infrared analysis. In a similar manner t-butylbenzene is metallated on the ring, yielding t-butylphenyllithium·TMEDA. These compounds are more reactive than either benzyllithium·TMEDA or phenyllithium·TMEDA by virtue of the electron releasing ability of the tertiary butyl group. They will, in fact, metallate benzene or toluene rapidly when added to these solvents. Because of the lower acidity of the hydrogen in t-butylbenzene, retallation on the ring has only been accomplished previously using sodium or potassium alkyls yielding compounds which have only limited use in organic syntheses. Therefore, this invention makes readily available for the first time the lithiated derivatives which are of much greater utility in Grignard-type reactions, catalysis, etc.

EXAMPLE 20

Metallations can also be carried out in the presence of only catalytic amounts of the chelating polyamine. This may be desirable to reduce the costs or the use the organometallic compound for reactions in which the polyamine may be undesirable. Removal of the chelating base from the organolithium compound can also be done by using other complexing agents. Thus, one can benefit from the facile metallation reaction in the presence of chelating polyamine and then isolate the organolithium compound substantially free of base. The chelating polyamine may be displaced from the complex by compounds, such as lithium salts, or it may be extracted from the complex by adding Lewis acids which form stronger complexes than does lithium. The following experiments demonstrate these features:

(A) To a solution of 0.98 g. (4 mmole) triphenylmethane in 5 ml. toluene was added 4 ml. 1 M tert-BuLi (4 mmole) and 1 ml. 1 M TMEDA (1 mmole). After 15 minutes at 25° C., the solution was heated to 50–60° C. for 1 hour, yielding a heavy red oil. Repeated vacuum drying yielded 1.20 g. orange-red crystals (calc. for

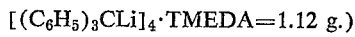
$[(C_6H_5)_3CLi]_4·TMEDA=1.12$ g.)

Analysis: 2.43% N (calc. 2.51). The product was characterized by reaction with $ClSi(CH_3)_3$ to yield

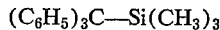
$(C_6H_5)_3C—Si(CH_3)_3$ (B) The procedure of A was repeated except that the amount of TMEDA was doubled. The yield of red crystals of $[(C_6H_5)_3CLi]_2·TMEDA$ was 1.31 g. (cal. 1.33 g.). Analysis: 4.54% N (calc. 4.54).

EXAMPLE 21

Following the procedure of Example 13, the xylene isomers were metallated to produce the corresponding xylyllithium·TMEDA compounds. The product from p-xylene was obtained as pale yellow needle crystals, whereas that from m-xylene was a viscous red-brown oil.

EXAMPLE 22

Piperidine (2 mmoles) in 10 ml. n-heptane was metallated with 2 mmoles BuLi+2 mmoles PMDT at 25° C. for a few minutes. The slightly cloudy solution was evaporated to dryness, yielding 0.436 g. light yellow crystals (82% yield) of PMDT·Li-piperidide. Analysis: 20.9% N (calc. 21.2).

EXAMPLE 23

In identical experiments, t-butanol and n-butanol were reacted with equimolar amounts of BuLi·TMCHDA in heptane and the metallation products were isolated as soft white solids.

| | Percent yield | Percent nitrogen | |
|---|---|---|---|
| | | Found | Calc'd |
| TMCHDA·Li-O-t-Bu | 83 | 11.8 | 11.2 |
| TMCHDA·Li-O-n-Bu | 84 | 11.1 | 11.2 |

Reaction of TMCHDA·Li-O-t-Bu with $ClSi(CH_3)_3$ produced the expected $t-BuOSi(CH_3)_3$.

EXAMPLE 24

Diphenylmethane (20 mmoles) in 40 ml. n-heptane was metallated with 20 mmoles BuLi·PMDT and the product was allowed to stand several days. Vacuum drying the total mixture gave a 94.5% yield of

$PMDT·Li-CH(C_6H_5)_2$ yellow crystals. Analysis: 12.23% N (calc. 12.1).

What is claimed is:
1. A crystalline composition having the formula:

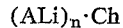
$(ALi)_n·Ch$ wherein $n$ is at least 0.5; (ALi) is a organolithium compound in which A is a monovalent hydrocarbon group-containing radical derived from compounds having formulae selected from the group consisting of:

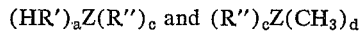
$(HR')_aZ(R'')_c$ and $(R'')_cZ(CH_3)_d$ wherein R' is a $C_6$–$C_{30}$ hydrocarbon radical containing aromatic or olefinic groups and the hydrogen attached to R' is an aromatic, benzylic, or allylic hydrogen atom; Z is silicon; R'' is hydrogen or a $C_1$–$C_{30}$ hydrocarbon radical, $a$ and $c$ are integers whose sum is equal to the valence of Z; $d$ is an integer of at least 1, and the sum of $c$ and $d$ is equal to the valence of Z; Ch is a tertiary chelating polyamine having from 4 to about 50 carbon atoms and is a monomer or polymer whose monomeric units have the following formula:

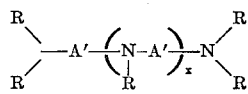

wherein the R groups may be the same or different alkyl radicals containing 1 to 4 carbon atoms, $x$ is an integer from 0 to 2, and A' is a nonreactive group selected from the group consisting of (1) aromatic radicals and cycloaliphatic radicals having ring structures containing 4–7 members, including the lower alkyl derivatives of said radicals wherein said radicals are attached to the nitrogen atoms at 1,2 or 1,3 positions on the rings; and (2) 1 to 4 methylenic hydrocarbon radicals wherein each methylenic radical contains 0 to 2 monovalent hydrocarbon radicals selected from the group consisting of alkyl and cycloalkyl and having 1 to 6 carbon atoms.

2. The composition of claim 1 wherein $n$ ranges from 0.5 to 10.
3. The composition of claim 1 wherein $n$ ranges from 1 to 7.
4. The composition of claim 1 wherein the polyamine is selected from the group consisting of diamines and triamines.
5. The composition of claim 1 wherein A' is selected from the group consisting of $C_5$–$C_6$ cycloalkylene and $C_2$–$C_3$ alkylene group.

References Cited
UNITED STATES PATENTS
2,386,452   10/1945   Fleming _____ 260—448.2

TOBIAS E. LEVOW, Primary Examiner

W. F. W. BELLAMY, Assistant Examiner

U.S. Cl. X.R.
252—431N